United States Patent
Lee et al.

(10) Patent No.: US 8,340,035 B2
(45) Date of Patent: Dec. 25, 2012

(54) METHOD AND APPARATUS FOR CHANGING COMMUNICATION LINK BETWEEN SOURCE DEVICES AND SINK DEVICES

(75) Inventors: Jae-min Lee, Suwon-si (KR); Pil-soon Choi, Anyang-si (KR); Chan-yeul Kwon, Yongin-si (KR); Ji-seong Oh, Seongnam-si (KR); Jae-hwa Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 590 days.

(21) Appl. No.: 12/629,468

(22) Filed: Dec. 2, 2009

(65) Prior Publication Data

US 2010/0135259 A1    Jun. 3, 2010

Related U.S. Application Data

(60) Provisional application No. 61/122,084, filed on Dec. 12, 2008, provisional application No. 61/119,115, filed on Dec. 2, 2008.

(30) Foreign Application Priority Data

Jun. 9, 2009    (KR) .................. 10-2009-0051059

(51) Int. Cl.
*H04Q 7/00*    (2006.01)
*H04L 12/28*   (2006.01)
*H04J 3/26*    (2006.01)

(52) U.S. Cl. ........ 370/329; 370/390; 370/392; 370/432; 370/458; 370/468

(58) Field of Classification Search .................. None
See application file for complete search history.

(56) References Cited

U.S. PATENT DOCUMENTS

| | | | |
|---|---|---|---|
| 2005/0254524 A1* | 11/2005 | An .................... | 370/487 |
| 2007/0155315 A1* | 7/2007 | Lee et al. ............. | 455/11.1 |
| 2008/0068152 A1* | 3/2008 | Igoe ................... | 340/531 |
| 2010/0319037 A1* | 12/2010 | Kim et al. ............ | 725/81 |

FOREIGN PATENT DOCUMENTS

EP      1596559 A2 * 11/2005
WO   WO 2008072910 A2 *  6/2008

* cited by examiner

*Primary Examiner* — Yemane Mesfin
*Assistant Examiner* — Christine Duong
(74) *Attorney, Agent, or Firm* — Sughrue Mion, PLLC

(57) ABSTRACT

Provided is a method of changing a communication link between source devices and sink devices. The method includes in a first downlink period, broadcasting an uplink period allocation message to the sink devices and passive source devices by an active source device, which establishes a communication link with a primary sink device from among the sink devices; during a first uplink period, broadcasting by a primary passive source device a link set message for establishing a communication link with the primary sink device to all the source devices in the network; during a second downlink period, relaying the link set message to all the sink devices in the network, wherein the link set message is relayed by the active source device; and during a second uplink period, establishing a communication link between the primary sink device and the primary passive source device by the primary sink device.

39 Claims, 10 Drawing Sheets

METHOD AND APPARATUS FOR CHANGING COMMUNICATION LINK BETWEEN SOURCE DEVICES AND SINK DEVICES

CROSS-REFERENCE TO RELATED PATENT APPLICATION

This application claims priority from U.S. Provisional Application No. 61/119,115, filed on Dec. 2, 2008, U.S. Provisional Application No. 61/122,084, filed on Dec. 12, 2008, and Korean Patent Application No. 10-2009-0051059, filed on Jun. 9, 2009, the disclosures of which are incorporated herein in their entirety by reference.

BACKGROUND

1. Field of the Invention

Methods and apparatuses consistent with the exemplary embodiments relate to changing a communication link between source devices and sink devices.

2. Description of the Related Art

Wireless Home Digital Interface (WHDI) is a technology for transmitting uncompressed 720p and 1080i video up to a distance of 30 meters in a wireless band of 5 GHz by using a bandwidth of 20 MHz.

FIG. 1 is a diagram illustrating a method of changing a communication link between source devices and sink devices in a general WHDI-based network. Referring to FIG. 1, a solid line connecting a first source device 110 and a sink device 130 to each other denotes that a communication link is established between the first source device 110 and the sink device 130. The first source device 110 may stream audio data, video data, etc. to the first sink device 130 via the communication link.

A dashed line connecting a second source device 120 and the sink device 130 to each other denotes that a communication link can be established between the second source device 120 and the sink device 130.

The first source device 110 and the second source device 120 cannot concurrently establish a communication link with the sink device 130. Thus, a communication link established between the first source device 110 and the sink device 130 has to be terminated in order to establish a communication link between the second source device 120 and the sink device 130.

The WHDI 0.6 specifications define such a communication link change between source devices and sink devices.

SUMMARY

One or more exemplary embodiments provide a method and apparatus for changing a communication link between source devices and sink devices.

According to an aspect of exemplary embodiment, there is provided a method of changing a communication link between source devices and sink devices in a network in which uplink periods for uplink transmission and downlink periods for downlink transmission are alternately scheduled, the method including in a first downlink period, broadcasting an uplink period allocation message to the sink devices and passive source devices by an active source device, which establishes a communication link with a primary sink device from among the sink devices, wherein the uplink period allocation message instructs that a subsequent uplink period be allocated to the passive source devices to which a communication link is not set; in a first uplink period, broadcasting a link set message for establishing a communication link with the primary sink device to all the source devices in the network, wherein the link set message is broadcast by a primary passive source device from among the passive source devices; in a second downlink period, relaying the link set message to all the sink devices in the network, wherein the link set message is relayed by the active source device; and in a second uplink period, establishing a communication link between the primary sink device and the primary passive source device by the primary sink device.

The establishing of the communication link between the primary sink device and the primary passive source may include broadcasting a link response message to the all source devices in the network, wherein the link response message is broadcast by the primary sink device, and wherein the link response message includes an acknowledgement of receipt of the link set message, a request for canceling the communication link established with the active source device, and a request for establishing the communication link with the primary passive source device.

The uplink period allocation message broadcast in the first downlink period and the link set message relayed in the second downlink period may have a first message format, and the link set message broadcast in the first uplink period and a link response message for establishing the communication link broadcast in the second uplink period may have a second message format, wherein the first message format and the second message format are generated according to different modulation methods.

The link set message may include message type information indicating that the link set message is broadcast to establish a communication link between a source device and a sink device; identifier of the primary passive source device; and identifier of the primary sink device.

The relaying of the link set message may include broadcasting a link relay message that includes the link set message, identifier of a device corresponding to a final destination of the link set message, and the whole length of the link relay message.

According to another aspect of an exemplary embodiment, there is provided a method of changing a communication link between source devices and sink devices in a network in which uplink periods for uplink transmission and downlink periods for downlink transmission are alternately scheduled, the method including in a first uplink period, broadcasting an uplink period allocation requesting message to all the source devices in the network, wherein the uplink period allocation message is broadcast by a primary sink device from among the sink devices, and wherein the uplink period allocation requesting message requests that passive source devices in which a communication link is not set use a subsequent uplink period; in a first downlink period, broadcasting an uplink period allocation message to all the sink devices in the network, wherein the uplink period allocation message is broadcast by an active source device of the source devices that establishes a communication link with the primary sink device, and wherein the uplink period allocation message instructs that the subsequent uplink period be allocated to the passive source devices; in a second uplink period, broadcasting a link set message to all the source devices, wherein the link set message is broadcast by a primary passive source device, and wherein the link set message is broadcast to establish a communication link between the primary passive source among the source devices and the primary sink device; in a second downlink period, relaying the link set message to all the sink devices, wherein the link set message is relayed by the active source device; and in a third uplink period, establishing a communication link between the primary passive source device and the primary sink device by the primary sink device.

The method may further include in a third downlink period prior to the first downlink period, broadcasting an uplink period permission message to all the sink devices, wherein the uplink period permission message is broadcast by the active source device, and wherein the uplink period permission message indicates that the passive source devices are allowed to use uplink periods.

The uplink period permission message broadcast in the third downlink period, the uplink period allocation message broadcast in the first downlink period, and the link set message broadcast in the second downlink period may have a first message format. The uplink period allocation requesting message broadcast in the first uplink period, the link set message broadcast in the second uplink period, and a link response message for establishing the communication link broadcast in the third uplink period may have a second message format. The first message format and the second message format may be generated according to different modulation methods.

The establishing of the communication link between the primary passive source device and the primary sink device may include broadcasting a link response message to the all source devices in the network, wherein the link response message is broadcast by the primary sink device, and wherein the link response message includes an acknowledgement of receipt of the link set message, a request for canceling the communication link established with the active source device, and a request for establishing the communication link with the primary passive source device.

The primary sink device may further transmit at least one control signal in at least one uplink period except for the first uplink period, the second uplink period, and the third uplink period, and the uplink period allocation requesting message may be transmitted earlier than the at least one control signal.

According to another aspect of an exemplary embodiment, there is provided a method of changing a communication link between source devices and sink devices in a network in which uplink periods for uplink transmission and downlink periods for downlink transmission are alternately scheduled, the method including in a first uplink period, broadcasting an uplink period allocation requesting message to all the source devices in the network, wherein the uplink period allocation message is broadcast by a primary sink device from among the sink devices, and wherein the uplink period allocation requesting message requests passive source devices, in which a communication link is not set to, use a subsequent uplink period; in a first downlink period, broadcasting an uplink period allocation message to all the sink devices in the network, wherein the uplink period allocation message is broadcast by an active source device that establishes a communication link with the primary sink device, and wherein the uplink period allocation message instructs that the subsequent uplink period be allocated to the passive source devices; in a second uplink period, broadcasting a link set message to all the sink devices, wherein the link set message is broadcast by the primary passive source device, and wherein the link set message is broadcast to establish a communication link between the primary passive source device and the primary sink device; and in a third uplink period, establishing a communication link between the primary passive source device and the primary sink device by the primary sink device.

The uplink period allocation requesting message may include a preamble; a channel estimation sequence for estimating characteristics of a channel via which messages are transmitted; message type information indicating that the uplink period allocation requesting message is broadcast for requesting the passive source devices to use the subsequent uplink period; a time offset for determining a start of the subsequent uplink period to be allocated to the passive source devices; and a duration of the subsequent uplink period to be allocated.

The channel estimation sequence may include sixteen symbols or less.

The method may further include in a second downlink period prior to the first downlink period, broadcasting an uplink period permission message to all the sink devices, wherein the uplink period permission message is broadcast by the active source device, and wherein the uplink period permission message indicates that the passive source devices are allowed to use uplink periods.

The uplink period permission message broadcast in the second downlink period and the uplink period allocation message in the first downlink period may have a first message format. The uplink period allocation requesting message broadcast in the first uplink period and a link response message for establishing the communication link broadcast in the third uplink period may have a second message format. The link set message broadcast in the second uplink period may have a third message format generated by extracting a part of the first message format. The first message format and the third message format may be generated according to modulation methods which are different from a modulation method used to generate the second message format.

The uplink period allocation message broadcast in the first downlink period may have a first message format. The uplink period allocation requesting message broadcast in the first uplink period and the link response message broadcast in the third uplink period may have a second message format. The link set message broadcast in the second uplink period may have a third message format generated by extracting a part of the first message format. The first message format and the third message format may be generated according to modulation methods which are different from a modulation method used to generate the second message format.

The first message format may include a header and a payload, the third message format may include only a header, and the sum of a length of the header of the first message format and a length of the header of the third message format may be less than a vertical blanking period.

The primary sink device may transmit at least one control signal in at least one uplink period except for the first uplink period, the second uplink period, and the third uplink period, and the uplink period allocation requesting message may be transmitted earlier than the at least one control signal.

According to another aspect of an exemplary embodiment, there is provided a network system in which uplink periods for uplink transmission between source devices and sink devices and downlink periods for downlink transmission between the source devices and the sink devices are alternately scheduled, the network system including an active source device establishing a communication link with a primary sink device from among the sink devices, and broadcasting an uplink period allocation message to the sink devices and passive source devices, in a first downlink period, where the uplink period allocation message instructs that a subsequent uplink period be allocated to the passive source devices in which a communication link is not set; a primary passive source device broadcasting a link set message to all the source devices in the network in a first uplink period, where the link set message is broadcast to establish a communication link between the primary passive source device and the primary sink device; and the primary sink device establishing a communication link with the primary passive source device in a second uplink period when the active source device relays the link set message to all the sink devices in the network in a second downlink period.

According to another aspect of an exemplary embodiment, there is provided a network system in which uplink periods for uplink transmission between source devices and sink devices and downlink periods for downlink transmission between the source devices and the sink devices are alternately scheduled, the network system including a primary sink device broadcasting an uplink period allocation requesting message to all the source devices in the network in a first uplink period, where the uplink period allocation requesting message requests passive source devices, in which a communication link is not set, to use a subsequent uplink period; an active source device establishing a communication link with the primary sink device, and broadcasting an uplink period allocation message to all the sink devices in the network in a first downlink period, where the uplink period allocation message instructs that the subsequent uplink period be allocated to the passive source devices; and a primary passive source device broadcasting a link set message for establishing a communication link with the primary sink device to all the source devices in a second uplink period, wherein, when the active source device relays the link set message to all the sink devices in the second downlink period, the primary sink device establishes a communication link with the primary passive source device in a third uplink period.

According to another aspect of an exemplary embodiment, there is provided a network system in which uplink periods for uplink transmission between source devices and sink devices and downlink periods for downlink transmission between the source devices and the sink devices are alternately scheduled, the network system including a primary sink device broadcasting an uplink period allocation requesting message to all the source devices in the network in a first uplink period, where the uplink period allocation requesting message requests passive source devices, in which a communication link is not set, to use a subsequent uplink period; an active source device establishing a communication link with the primary sink device, and broadcasting an uplink period allocation message to all the sink devices in the network in a first downlink period, where the uplink period allocation message instructs that the subsequent uplink period be allocated to the passive source devices; and a primary passive source device broadcasting a link set message for establishing a communication link with the primary sink device to all the sink devices in a second uplink period, wherein the primary sink device establishes a communication link with the primary passive source device in a third uplink period.

According to another aspect of an exemplary embodiment, there is provided a computer readable recording medium having recorded thereon a computer program for executing a method of changing a communication link between source devices and sink devices in a network in which uplink periods for uplink transmission and downlink periods for downlink transmission are alternately scheduled, the method including in a first downlink period, broadcasting an uplink period allocation message to the sink devices and passive source devices by an active source device, which establishes a communication link with a primary sink device from among the sink devices, wherein the uplink period allocation message instructs that a subsequent uplink period be allocated to the passive source devices to which a communication link is not set; in a first uplink period, broadcasting a link set message for establishing a communication link with the primary sink device to all the source devices in the network, wherein the link set message is broadcast by a primary passive source device from among the passive source devices; in a second downlink period, relaying the link set message to all the sink devices in the network, wherein the link set message is relayed by the active source device; and in a second uplink period, establishing a communication link between the primary sink device and the primary passive source device by the primary sink device.

According to another aspect of an exemplary embodiment, there is provided a computer readable recording medium having recorded thereon a computer program for executing a method of changing a communication link between source devices and sink devices in a network in which uplink periods for uplink transmission and downlink periods for downlink transmission are alternately scheduled, the method including in a first uplink period, broadcasting an uplink period allocation requesting message to all the source devices in the network, wherein the uplink period allocation message is broadcast by a primary sink device from among the sink devices, and wherein the uplink period allocation requesting message requests that passive source devices in which a communication link is not set use a subsequent uplink period; in a first downlink period, broadcasting an uplink period allocation message to all the sink devices in the network, wherein the uplink period allocation message is broadcast by an active source device of the source devices that establishes a communication link with the primary sink device, and wherein the uplink period allocation message instructs that the subsequent uplink period be allocated to the passive source devices; in a second uplink period, broadcasting a link set message to all the source devices, wherein the link set message is broadcast by a primary passive source device, and wherein the link set message is broadcast to establish a communication link between the primary passive source among the source devices and the primary sink device; in a second downlink period, relaying the link set message to all the sink devices, wherein the link set message is relayed by the active source device; and in a third uplink period, establishing a communication link between the primary passive source device and the primary sink device by the primary sink device.

According to another aspect of an exemplary embodiment, there is provided a computer readable recording medium having recorded thereon a computer program for executing a method of changing a communication link between source devices and sink devices in a network in which uplink periods for uplink transmission and downlink periods for downlink transmission are alternately scheduled, the method including in a first uplink period, broadcasting an uplink period allocation requesting message to all the source devices in the network, wherein the uplink period allocation message is broadcast by a primary sink device from among the sink devices, and wherein the uplink period allocation requesting message requests passive source devices, in which a communication link is not set to, use a subsequent uplink period; in a first downlink period, broadcasting an uplink period allocation message to all the sink devices in the network, wherein the uplink period allocation message is broadcast by an active source device that establishes a communication link with the primary sink device, and wherein the uplink period allocation message instructs that the subsequent uplink period be allocated to the passive source devices; in a second uplink period, broadcasting a link set message to all the sink devices, wherein the link set message is broadcast by the primary passive source device, and wherein the link set message is broadcast to establish a communication link between the primary passive source device and the primary sink device;

and in a third uplink period, establishing a communication link between the primary passive source device and the primary sink device by the primary sink device.

BRIEF DESCRIPTION OF THE DRAWINGS

The above and other aspects will become more apparent by describing in detail exemplary embodiments with reference to the attached drawings in which.

DETAILED DESCRIPTION OF EXEMPLARY EMBODIMENTS

Figure 1:
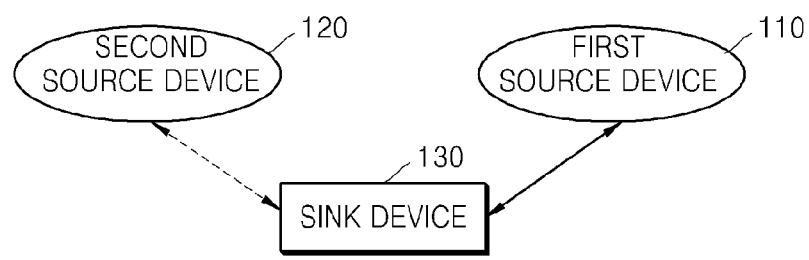
FIG. 1 is a diagram illustrating a method of changing a communication link between source devices and sink devices in a general WHDI-based network.
Figure 2:
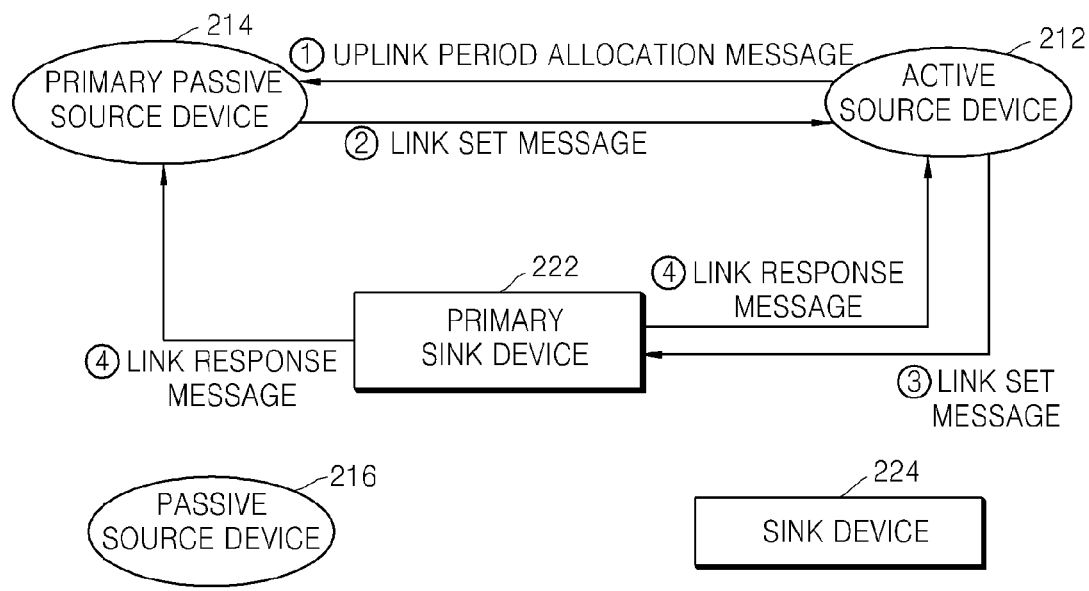
FIG. 2 is a diagram illustrating a method of changing a communication link between source devices and sink devices, according to an exemplary embodiment.

FIG. 2 is a diagram illustrating a method of changing a communication link between source devices and sink devices, according to an exemplary embodiment. In operation 1, in a first downlink period, an active source device 212 that establishes a communication link with a primary sink device 222, broadcasts an uplink period allocation message to the primary sink device 222, a sink device 224 and a primary passive source device 214 and a passive source device 216. Here, the uplink period allocation message instructs that a subsequent uplink period be allocated to the passive source devices 214 and 216 in which a communication link is not set.

The uplink period allocation message may be formed in the form of a bitmap. In this case, the uplink period allocation message may be constructed such that when a predetermined field has a value of '1', the subsequent uplink period will be allocated to the passive source devices 214 and 216.

Here, the active source device 212 is a source device that is currently streaming data to the primary sink device 222, and the primary sink device 222 is a sink device that establishes a communication link with the active source device 212 in order to receive the streaming data from the active source device 212. Also, the passive source device 216 is a source device that does not establish a communication link with any sink device, e.g., the sink devices 222 and 224, and the primary passive source device 214 is a source device that will establish a communication link with the primary sink device 222.

A downlink period is a period in which a source device transmits a message to a sink device, and an uplink period is a period in which the sink device transmits a message to the source device. According to an exemplary embodiment, a plurality of downlink periods and a plurality of uplink periods may be alternately scheduled.

Although, for convenience of explanation, FIG. 2 illustrates that the active source device 212 transmits the uplink period allocation message to the primary passive source device 214, the uplink period allocation message is actually broadcast to all of the primary passive source device 214, the passive source device 216, and the sink devices 222 and 224.

For convenience of explanation, some messages that are broadcast may be illustrated in the drawings.

In operation 2, in a first uplink period, the primary passive source device 214 broadcasts a link set message to both the source devices 212 and 216 in the network in order to establish a communication link with the primary sink device 222.

Although it has been described with reference to FIG. 2 that the primary passive source device 214 is predetermined as a primary passive source device that will establish a communication link with the primary sink device 222, the primary passive source device 214 is not actually predetermined as a primary passive source device but instead is determined to be a primary passive source device since the primary passive source device 214 broadcasts the link set message earlier than the passive source device 216

The passive source devices 214 and 216 may concurrently broadcast the link set message. In this case, a contention may occur between the passive source devices 214 and 216. A method of preventing such a contention from occurring may be applied to the present invention.

The primary passive source device 214 may broadcast a link relay message that includes the link set message and an identifier (ID) of a device corresponding to a final destination of the link set message, instead of the link set message.

The structures of the link set message and the link relay message will be described with reference to FIGS. 4 and 5 later.

In operation 3, in a second downlink period, the active source device 212 relays the link set message received from the primary passive source device 214 to both the sink devices 222 and 224 in the network.

In this case, even if the active source device 212 receives the link relay message from the primary passive source device 214, the active source device 212 does not broadcast the link relay message but relays the link set message included in the link relay message to the sink devices 222 and 224.

In operation 4, in a second uplink period, the primary sink device 222 broadcasts a link response message to all the source devices 212, 214, and 216 in the network. The link response message includes an acknowledgement of receipt of the link set message, a request for canceling the communication link between the primary sink device 222 and the active source device 212, and a request for establishing a communication link between the primary sink device 222 and the primary passive source device 214. When the active source device 212 and the primary passive source device 214 receive the link response message, the communication link between the primary sink device 222 and the active source device 212 is canceled and a communication link is established between the primary sink device 222 and the primary passive source device 214.

Alternatively, in operation 4, the primary sink device 222 may broadcast a link response message that includes a request for canceling the communication link between the primary sink device 222 and the active source device 212 in the second uplink period, and then may broadcast a link response message that includes a request for establishing a communication link between the primary sink device 222 and the primary passive source device 214 in a third uplink period.

Figure 3:
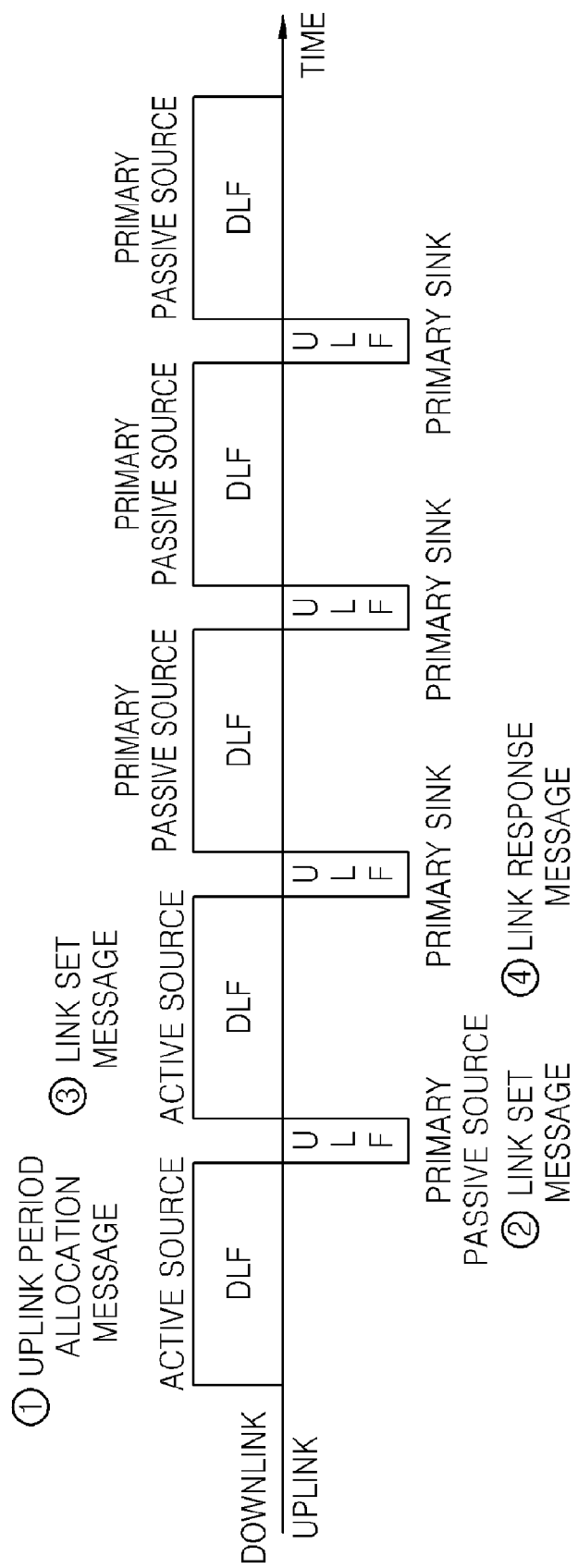
FIG. 3 illustrates a time schedule according to the method of FIG. 2, according to an exemplary embodiment.

FIG. 3 illustrates a time schedule according to the method of FIG. 2, according to an exemplary embodiment. In FIG. 3, a horizontal axis is a time axis, and downlink periods are illustrated above the time axis and uplink periods are illustrated below the time axis. The durations of the uplink periods are far shorter than those of the downlink periods. "DLF" stands for a downlink frame that is transmitted in a downlink period, and "ULF" stands for an uplink frame that is transmitted in an uplink period, where downlink frames DLF and uplink frames ULF have different formats.

For example, each of the downlink frames DLF may include a header and a payload. The header may include an uplink period allocation message and a link set message. The payload may include control data for controlling an operation performed between a source device and a sink device, and audio/video data to be streamed to a sink device. Each of the uplink frames ULF may not include a payload and may include a link set message, a link response message, and control data. As described above, the amount of information included in the uplink frames ULF is less than the amount of information included the downlink frames DLF, and thus, the uplink frames ULF may be broadcast within a shorter duration.

The downlink frames DLF and the uplink frames ULF are generated according to different modulation methods. Basically, the downlink frames DLF are modulated so that sink devices can interpret them and the uplink frames ULF are modulated so that source devices can interpret them. Thus, when a source device receives a downlink frame DLF, the source device cannot interpret the downlink frame DLF, and when a sink device receives an uplink frame ULF, the sink device cannot interpret the uplink frame ULF.

The time schedule illustrated in FIG. 3 will now be described in detail.

In the first downlink period, the active source device 212 broadcasts a downlink frame that includes an uplink period allocation message to the sink devices 222 and 224 and the passive source devices 214 and 216 (operation 1).

In the first uplink period, the primary passive source device 214 broadcasts an uplink frame that includes a link set message to both the source devices 212 and 216 in a network (operation 2).

Figure 4:
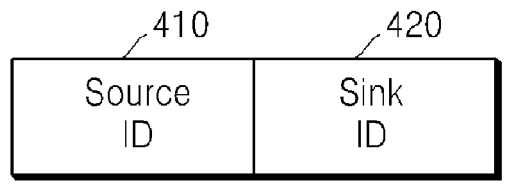
FIG. 4 is a diagram illustrating the structure of a link set message according to an embodiment of the present invention.

FIG. 4 is a diagram illustrating the structure of a link set message according to an exemplary embodiment. Referring to FIG. 4, a body of the link set message includes a source ID field 410 and a sink ID field 420 according to an exemplary embodiment. In the current embodiment, the ID of a primary passive source device is recorded in the source ID field 410, and the ID of a primary sink device is recorded in the sink ID field 420.

The source ID field 410 and the sink ID field 420 are respectively used to define a source device and a sink device that establish a communication link with each other.

Although not shown in FIG. 4, the link set message may further include a field in which message type information is recorded to indicate that the link set message is to establish a communication link between a source device and a sink device.

In the current embodiment, if the active source device 212 of FIG. 2 receives such a link set message, the active source device 212 determines that the link set message instructs a communication link to be established between the primary passive source device 214 and the primary sink device 222, based on the field including the message type information, the source ID field 410, and the sink ID field 420, and then relays the link set message to both the sink devices 222 and 224 in the network.

Although the link set message is broadcast to both the sink devices 222 and 224, a final destination of the link set message is the primary sink device 222 that will establish a communication link. Thus, in a first uplink period, a link relay message that includes the link set message and the final destination of the link set message may be transmitted, instead of the link set message.

Figure 5:
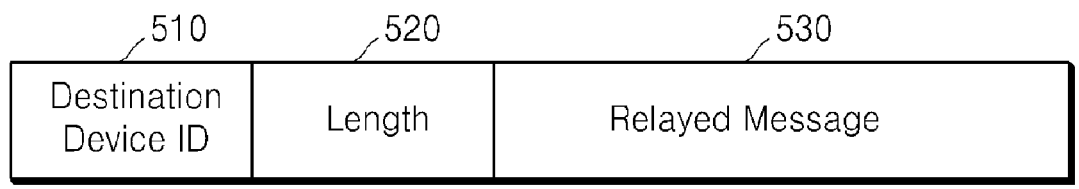
FIG. 5 is a diagram illustrating the structure of a link relay message according to an exemplary embodiment.

FIG. 5 is a diagram illustrating the structure of a link relay message according to an exemplary embodiment. Referring to FIG. 5, according to the current embodiment, the link relay message includes a destination device ID 510, a length field 520, and a relayed message field 530.

In the destination device ID 510, an ID corresponding to a device that is a final destination of the link relay message is recorded.

In the length field 520, information regarding the whole length of the link relay message is recorded.

In the relayed message field 530, a message that is to be relayed is recorded. In the current embodiment, the link set message of FIG. 3 is recorded in the relayed message field 530.

Referring back to FIG. 3, in a second downlink period, the active source device 212 relays a downlink frame DLF that includes a link set message received from the primary passive source device 214 to both the sink devices 222 and 224 in the network (operation 3).

In a second uplink period, the primary sink device 222 broadcasts an uplink frame ULF that includes a link response message to both the source devices 212, 214, and 216 in the network (operation 4).

As described above, when the active source device 212 receives a link response message from the primary sink device 222, the active source device 212 cancels a communication link established with the primary sink device 222, and when the primary passive source device 214 receives a link response message from the primary sink device 222, the primary passive source device 214 establishes a communication link with the primary sink device 222.

Referring to FIG. 3, in a third downlink period, a third uplink period, a fourth downlink period, a fourth uplink period, and a fifth downlink period, the primary passive source device 212 and the primary sink device 222 communicate with each other via a communication link established therebetween.

As described above, although source devices basically support only downlink transmission and uplink reception, it is assumed that in the current embodiment, the source devices 212, 214, and 216 are capable of not only supporting downlink receiving in order to receive a downlink frame DLF that includes an uplink period allocation message but also supporting uplink transmission in order to transmit an uplink frame ULF that includes a link set message. In other words, according to an exemplary embodiment, the source devices 212, 214, and 216 are capable of receiving and interpreting a downlink frame DLF, and generating and transmitting an uplink frame ULF.

Figure 6:
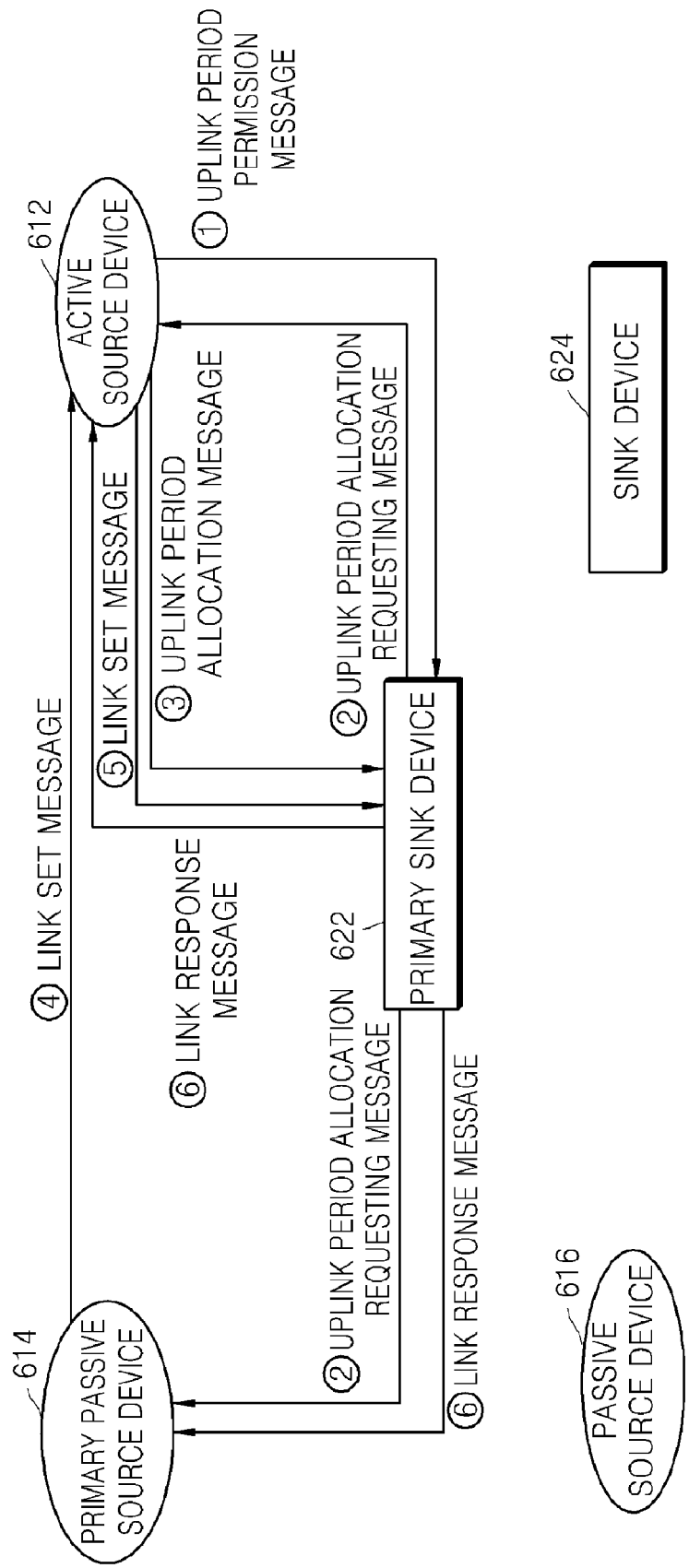
FIG. 6 is a diagram illustrating a method of changing a communication link between source devices and sink devices, according to another exemplary embodiment.

FIG. 6 is a diagram illustrating a method of changing a communication link between source devices and sink devices, according to another exemplary embodiment.

In operation 1, in a first downlink period, an active source device 612 broadcasts to both sink devices 622 and 624 an uplink period permission message indicating that passive source devices 614 and 616 are allowed to use uplink periods.

In operation 2, in a first uplink period, the primary sink device 622 broadcasts to all the source devices 612, 614, and 616 in the network an uplink period allocation requesting message requesting the passive source devices 614 and 616, which do not establish a communication link, to use a subsequent uplink period.

The structure of the uplink period allocation requesting message will be described with reference to FIG. 8 later.

In operation 3, in a second downlink period, the active source device 612 broadcasts to both the sink devices 622 and 624 in the network an uplink period allocation message that instructs the subsequent uplink period be allocated to the passive source devices 614 and 616.

In operation 4, in a second uplink period, the primary passive source device 614 broadcasts to all the source devices 612, 614, and 616 a link set message for establishing a communication link between the primary passive source device 614 and the primary sink device 622.

In operation 5, in a third downlink period, the active source device 612 relays the link set message received from the primary passive source device 614 to both the sink devices 622 and 624.

In operation 6, in a third uplink period, the primary sink device 622 broadcasts a link response message to all the source devices 612, 614, and 616. Here, the link response message includes an acknowledgment of receipt of the link set message, a request requesting that a communication link established between the active source device 612 and the primary sink device 622 be canceled, and a request requesting that a communication link be established between the primary sink device 622 and the primary passive source device 614.

Figure 7:
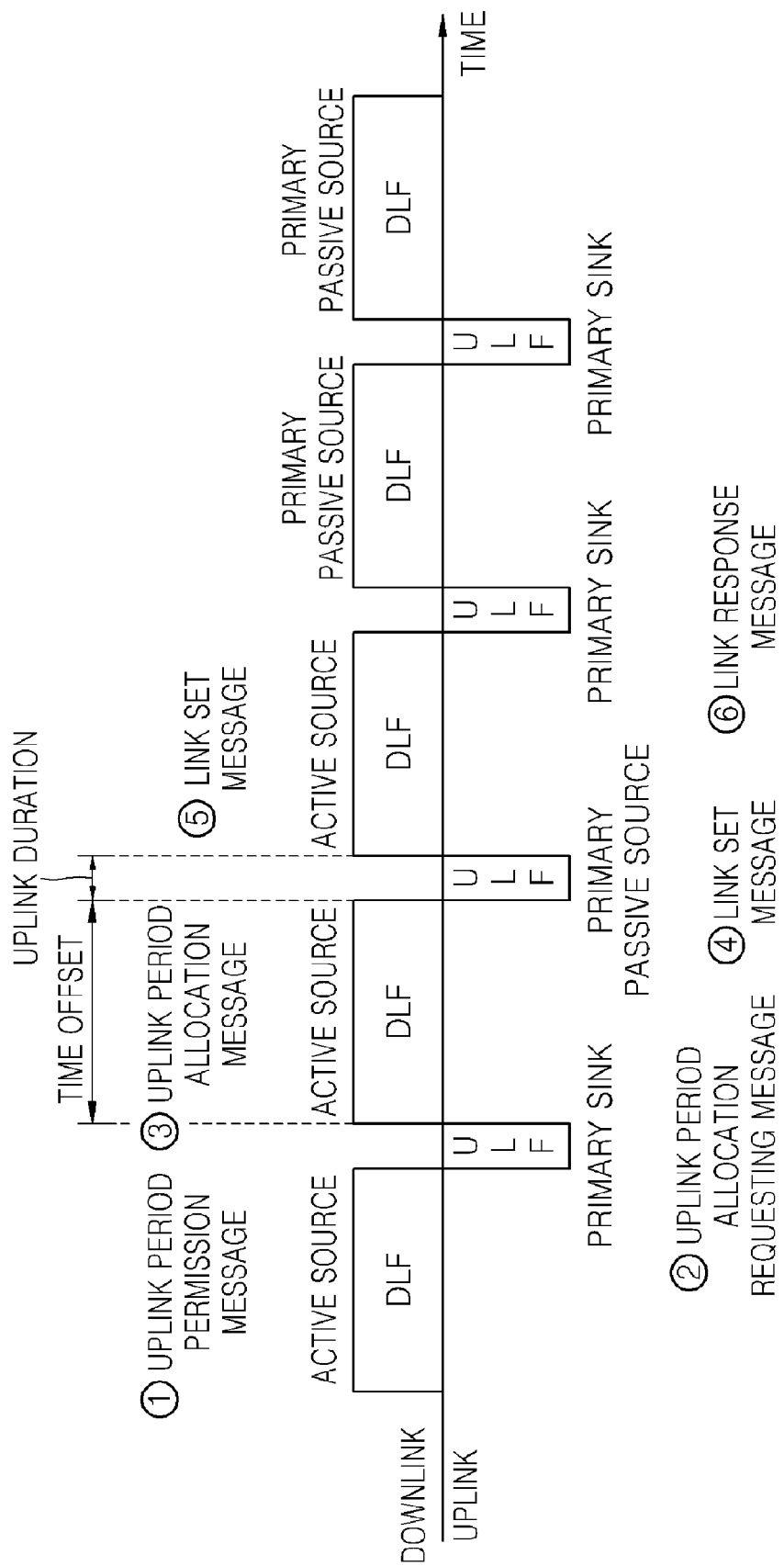
FIG. 7 illustrates a time schedule according to the method of FIG. 6, according to another exemplary embodiment.

FIG. 7 illustrates a time schedule according to the method of FIG. 6, according to another exemplary embodiment.

Referring to FIGS. 6 and 7, in a first downlink period, the active source device 612 broadcasts a downlink frame DLF that includes an uplink period permission message to both the sink devices 622 and 624 (operation 1).

In a first uplink period, the primary sink device 622 broadcasts an uplink frame ULF that includes an uplink period allocation requesting message to all the source devices 612, 614, and 616 in the network (operation 2).

Figure 8:
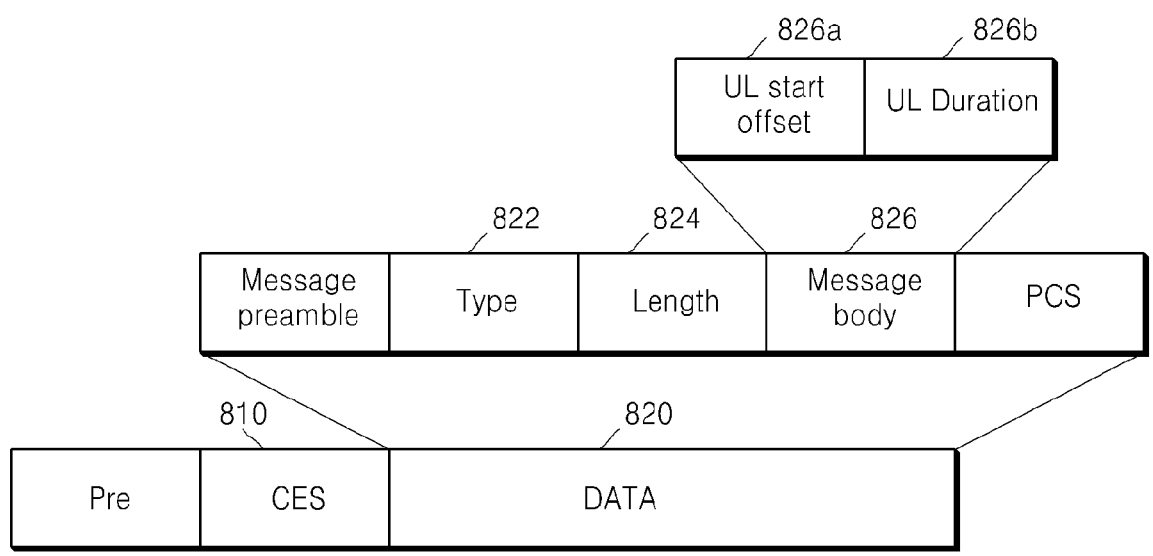
FIG. 8 is a diagram illustrating the structure of an uplink period allocation requesting message according to an exemplary embodiment.

FIG. 8 is a diagram illustrating the structure of an uplink period allocation requesting message according to an exemplary embodiment. Referring to FIG. 8, the uplink period allocation requesting message includes a preamble field, a channel estimation sequence field 810, and a data field 820.

In the channel estimation sequence field 810, a channel estimation sequence for estimating a channel via which a message is transmitted, is recorded.

The data field 820 includes a message preamble field, a message type field 822, a length field 824, a message body field 826, and a PCS field In the message type field 822, message type information indicating that the uplink period allocation requesting message requests passive source devices to use a subsequent uplink period, is recorded.

In the length field 824, information regarding the whole length of the uplink period allocation requesting message is recorded.

The message body field 826 includes an uplink start offset field 826a and an uplink duration field 826b.

In the uplink start offset field 826a, a time offset for determining the start of an uplink period to be allocated to passive source devices is recorded.

In the uplink duration field 826b, the duration of the uplink period to be allocated to the passive source devices is recorded.

Referring to FIG. 7, a time offset is illustrated above the second downlink period and an uplink duration is illustrated above the second uplink period.

The other fields included in the uplink period allocation requesting message are specifically defined in the WHDI 1.0 specifications and thus will not be described here.

Referring back to FIG. 7, in the second downlink period, the active source device 612 broadcasts a downlink frame that includes an uplink period allocation message to both the sink devices 622 and 624 in the network (operation 3).

In the second uplink period, the primary passive source device 614 broadcasts an uplink frame that includes a link set message to all the source devices 612, 614, and 616 (operation 4).

In the third downlink period, the active source device 612 relays a downlink frame that includes a link set message, which is received from the primary passive source device 614, to both the sink devices 622 and 624 (operation 5).

In the third uplink period, the primary sink device 622 broadcasts an uplink frame that includes a link response message to all the source devices 612, 614, and 616 (operation 6).

The primary sink device 622 may further transmit control signals in uplink periods. In this case, the uplink period allocation requesting message should be transmitted earlier than control signals.

For example, if in a first uplink period, the primary sink device 622 receives the uplink period permission message from the active source device 612 during preparing to transmit a control signal, then the primary sink device 622 may transmit the uplink period allocation requesting message instead of the control signal.

According to the current embodiment, the source devices 612, 614, and 616 are capable of not only supporting downlink transmission and uplink receiving but also supporting uplink transmission for transmitting an uplink frame that includes a link set message.

Figure 9:
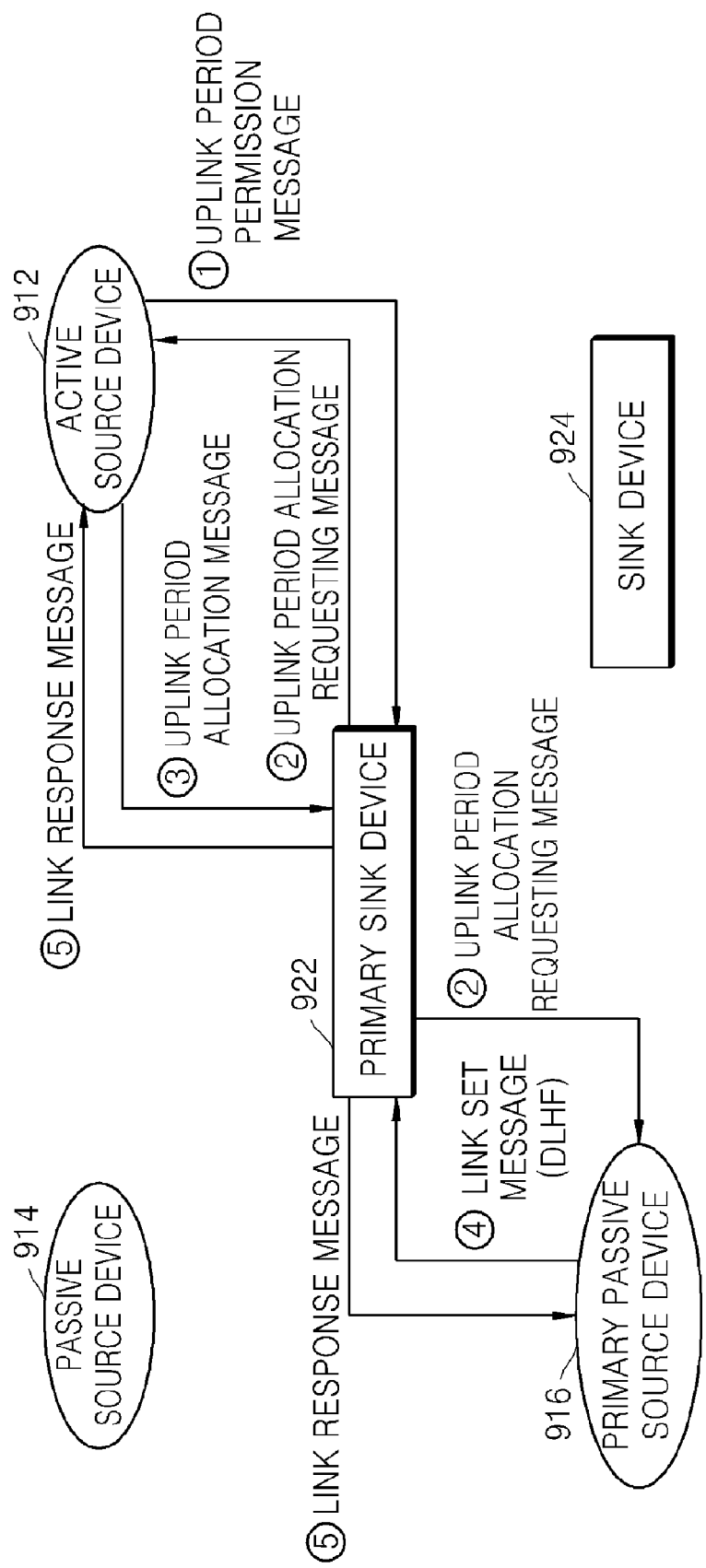
FIG. 9 is a diagram illustrating a method of changing a communication link between source devices and sink devices, according to another exemplary embodiment.

FIG. 9 is a diagram illustrating a method of changing a communication link between source devices and sink devices, according to another exemplary embodiment. In operation 1, in a first downlink period, an active source device 912 broadcasts to both sink devices 922 and 924 an uplink period permission message indicating that passive source devices 914 and 916 that do not establish a communication link are allowed to use an uplink period. In operation 2, in a first uplink period, the primary sink device 922 broadcasts to all the source devices 912, 914, and 916 in a network an uplink period allocation requesting message requesting the passive source devices 914 and 916 to use a subsequent uplink period.

In operation 3, in a second downlink period, the active source device 912 broadcasts to both the sink devices 922 and 924 an uplink period allocation message for allocating a subsequent uplink period to the passive source devices 914 and 916.

In operation 4, in a second uplink period, the primary passive source device 916 broadcasts to both the sink devices 922 and 924 a link set message for establishing a communication link between the primary sink device 922 and the primary passive source device 916.

In operation 5, in a third uplink period, the primary sink device 922 broadcasts a link response message to all the source devices 912, 914, and 916. The link response message includes an acknowledgement of receipt of the link set message, a request requesting that a communication link between the primary sink device 922 and the active source device 612 be canceled, and a request requesting that a communication link be established between the primary sink device 922 and the primary passive source device 914.

Compared to FIGS. 2 and 6, the primary passive source device 914 illustrated in FIG. 9 is located distant from the active source device 912 and thus may have difficulty communicating directly with the active source device 912. Thus, according to the current embodiment, the primary passive source device 914 may establish a communication link with the primary sink device 922 without having to communicate directly with the active source device 912.

Figure 10:
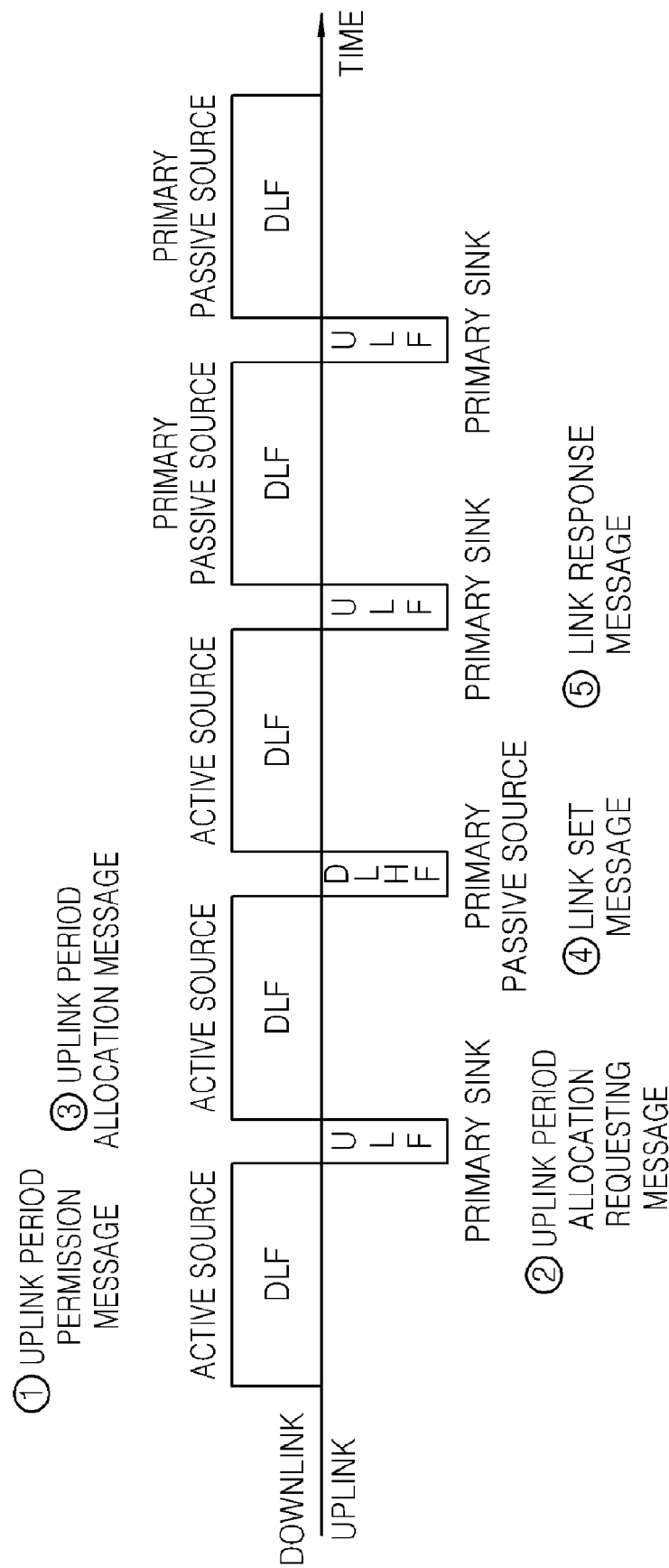
FIG. 10 illustrates a time schedule according to the method of FIG. 9, according to another exemplary embodiment.

FIG. 10 illustrates a time schedule according to the method of FIG. 9, according to another exemplary embodiment.

Referring to FIGS. 9 and 10, in a first downlink period, the active source device 912 broadcasts a downlink frame DLF that includes an uplink period permission message to both the sink devices 922 and 924 (operation 1).

In a first uplink period, the primary sink device 922 broadcasts an uplink frame ULF that includes an uplink period allocation requesting message to all the source devices 912, 914, and 916 in the network (operation 2).

In this case, the uplink period allocation requesting message may include a preamble, a channel estimation sequence, message type information, a time offset, and information regarding an uplink period duration, as described above.

In the WHDI 1.0 specifications, an uplink frame is defined to be broadcast together with a header of a downlink frame, which is broadcast in a downlink period following an uplink period in which the uplink frame is broadcast, in a vertical blanking (V-blanking) period. Both the uplink frame and information included in the header of the downlink frame can be broadcast only if the sum of the length of the uplink frame and the length of header of the downlink frame is less than the V-blanking period.

According to the current embodiment, a header of a downlink frame that is broadcast in a second downlink period includes an uplink period allocation message. Thus, the sum of the length of the uplink frame that is broadcast in the first uplink period and the length of the uplink period allocation message that is broadcast in the second downlink period should be less than the V-blanking period.

For example, to this end, the channel estimation sequence included in the uplink frame may include sixteen symbols or less although it generally includes twenty symbols, and the uplink period allocation requesting message included in the uplink frame may be eleven bytes long or less.

The V-blanking period would be obvious to those of ordinary skill in the art, and thus, will not be explained in detail here.

In the second downlink period, the active source device 912 broadcasts a downlink frame that includes an uplink period allocation message to both the sink devices 922 and 924 in the network (operation 3).

In a second uplink period, the primary passive source device 916 broadcasts a downlink header-only frame DLHF that includes a link set message to both the sink devices 922 and 924 (operation 4).

The downlink header-only frame DLHF is obtained by extracting only a header from a downlink frame and is broadcast from a source device to a sink device.

The reason why the downlink header-only frame DLHF is broadcast in the second uplink period is because the duration of an uplink period is much shorter than that of a downlink period and a long downlink frame cannot be completely transmitted within the uplink period.

Also, a channel estimation sequence included in the downlink header-only frame DLHF may include sixteen symbols or less in order to reduce the length of the downlink header-only frame DLHF, and a link set message included in the downlink header-only frame DLHF may be eleven bytes long or less.

In a third uplink period, the primary sink device 922 broadcasts an uplink frame that includes a link response message to all the source devices 912, 914, and 916 in the network (operation 5).

Referring to FIG. 10, a third downlink period is present between the second uplink period and the third uplink period. In the third downlink period, the active source device 912 does not transmit any messages but may stream audio/video data to the primary sink device 922.

In the current embodiment, the source devices 912, 914, and 916 may support only downlink transmission and uplink receiving.

Figure 11:
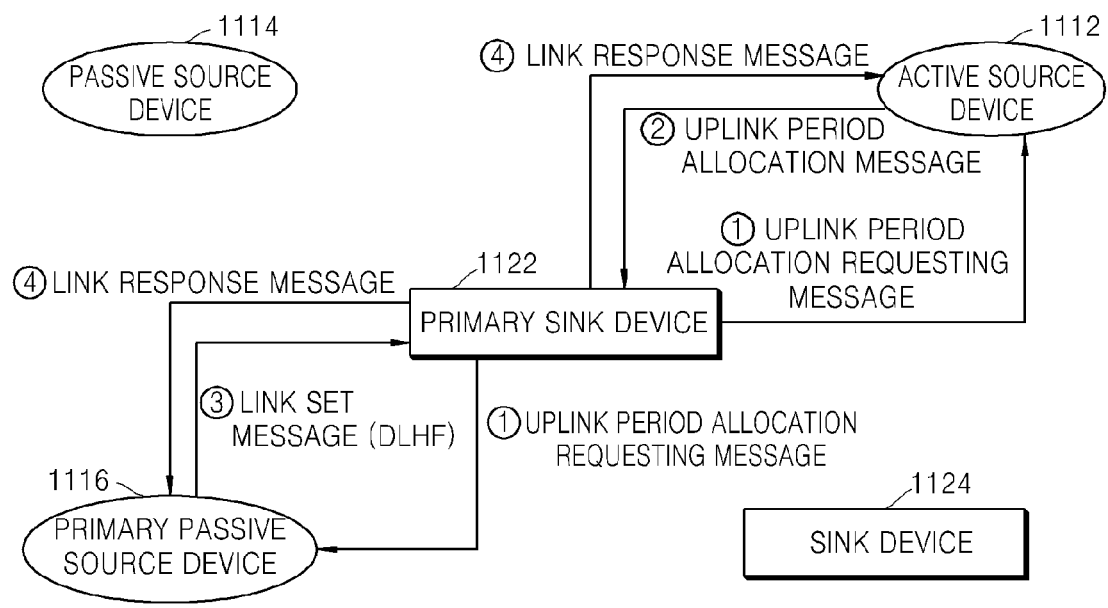
FIG. 11 is a diagram illustrating a method of changing a communication link between source devices and sink devices, according to another exemplary embodiment.

FIG. 11 is a diagram illustrating a method of changing a communication link between source devices and sink devices, according to another exemplary embodiment. The method of FIG. 11 is the same as the method of FIG. 9 except that in a first downlink period, an active source device 1112 does not broadcast an uplink period permission message to both sink devices 1122 and 1124. Thus, in the first uplink period, the primary sink device 1122 first broadcasts an uplink period allocation requesting message to all source devices 1112, 1114, and 1116 in a network.

In the current embodiment, the primary sink device 1122 may independently broadcast an uplink period allocation requesting message without having to receive an uplink period permission message from the active source device 1112.

Figure 12:
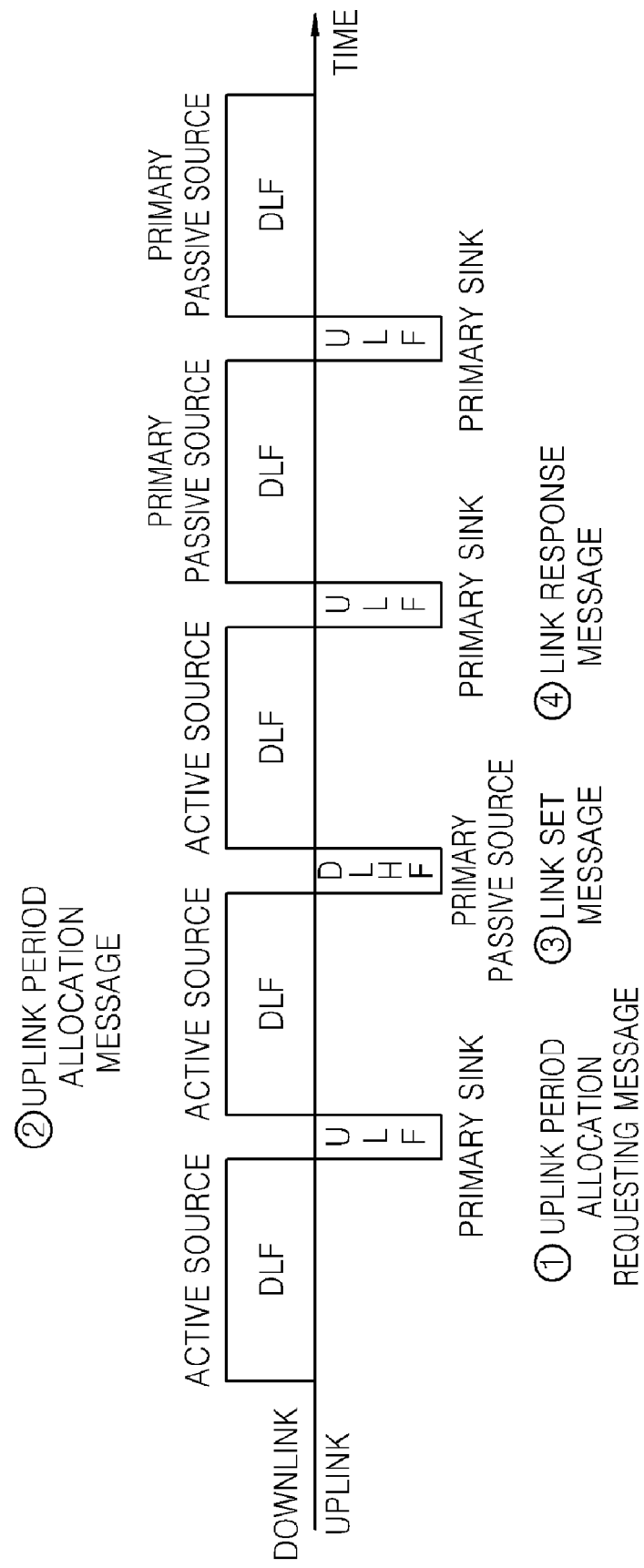
FIG. 12 illustrates a time schedule according to the method of FIG. 11, according to another exemplary embodiment.

FIG. 12 illustrates a time schedule according to the method of FIG. 11, according to another exemplary embodiment. The method of FIG. 12 is the same as the method of FIG. 10 except that in a first downlink period, the active source device 1112 of FIG. 11 does not broadcast a downlink frame that includes an uplink period permission message to both the sink devices 1122 and 1124 of FIG. 11.

Thus, in a first uplink period, first, the primary sink device 1122 broadcasts an uplink frame that includes an uplink period allocation requesting message to all the sink devices 1112, 1114, and 1116 in the network (operation 1).

Although in the above embodiments, messages are respectively broadcast in a plurality of consecutive uplink and downlink periods, messages may be respectively broadcast in a plurality of non-consecutive uplink and downlink periods.

For example, referring to FIG. 12, an uplink period allocation requesting message is broadcast in the first uplink period (operation 1), and then, an uplink period allocation message is broadcast in a second downlink period (operation 2). However, alternatively, only audio/video data may be streamed without broadcasting a message in a second downlink period and a second uplink period, an uplink period allocation message may be broadcast in a third downlink period, and then, a link set message may be broadcast in a third uplink period.

This is because as soon as a source device or a sink device receives a message, the source device or the sink device may broadcast a message corresponding thereto. However, in some cases, the source device or the sink device may receive a message and broadcast it after predetermined downlink or uplink periods.

In the related art, it is defined that a communication link may be changed between source devices and sink devices but actually, a method of changing a communication link has not been defined. However, as described above, according to the above embodiments, it is possible to effectively change a communication link between source devices and sink devices.

The above embodiments may be embodied as a computer program. The computer program may be stored in a computer readable recording medium and executed using a general digital computer. Examples of the computer readable recording medium include a magnetic recording medium (a ROM, a floppy disc, a hard disc, etc.), and an optical recording medium (a CD-ROM, a DVD, etc.).

While exemplary embodiments been particularly shown and described, it will be understood by those of ordinary skill in the art that various changes in form and details may be made therein without departing from the spirit and scope of the present invention as defined by the following claims.

What is claimed is:

1. A method of changing a communication link between source devices and sink devices in a network in which uplink periods for uplink transmission and downlink periods for downlink transmission are alternately scheduled, the method comprising:
   during a first downlink period, broadcasting an uplink period allocation message to the sink devices and passive source devices by an active source device, which establishes a communication link with a primary sink device from among the sink devices, wherein the uplink period allocation message instructs that a subsequent uplink period be allocated to the passive source devices to which a communication link is not set;
   during a first uplink period following the first downlink period, broadcasting a link set message for establishing a communication link with the primary sink device to all the source devices in the network, wherein the link set message is broadcast by a primary passive source device from among the passive source devices;
   during a second downlink period following the first uplink period, relaying the link set message to all the sink devices in the network, wherein the link set message is relayed by the active source device; and
   during a second uplink period following the second downlink period, establishing a communication link between the primary sink device and the primary passive source device by the primary sink device.

2. The method of claim 1, wherein the establishing the communication link between the primary sink device and the primary passive source comprises broadcasting a link response message to all the source devices in the network, wherein the link response message is broadcast by the primary sink device, and wherein the link response message comprises an acknowledgement of receipt of the link set message, a request for canceling the communication link established with the active source device, and a request for establishing the communication link with the primary passive source device.

3. The method of claim 1, wherein the uplink period allocation message broadcast during the first downlink period and the link set message relayed during the second downlink period have a first message format, and
   the link set message broadcast during the first uplink period and a link response message for establishing the communication link broadcast during the second uplink period have a second message format,
   wherein the first message format and the second message format are generated according to different modulation methods.

4. The method of claim 1, wherein the link set message comprises:
   message type information indicating that the link set message is broadcast to establish a communication link between a source device and a sink device;
   an identifier of the primary passive source device; and
   an identifier of the primary sink device.

5. The method of claim 4, wherein the relaying the link set message comprises broadcasting a link relay message that includes the link set message, an identifier of a device corresponding to a final destination of the link set message, and a whole length of the link relay message.

6. A method of changing a communication link between source devices and sink devices in a network in which uplink periods for uplink transmission and downlink periods for downlink transmission are alternately scheduled, the method comprising:
   during a first uplink period, broadcasting an uplink period allocation requesting message to all the source devices in the network, wherein the uplink period allocation message is broadcast by a primary sink device from among the sink devices, and wherein the uplink period allocation requesting message requests that passive source devices in which a communication link is not set use a subsequent uplink period;
   during a first downlink period following the first uplink period, broadcasting an uplink period allocation message to all the sink devices in the network, wherein the uplink period allocation message is broadcast by an active source device of the source devices that establishes a communication link with the primary sink device, and wherein the uplink period allocation message instructs that the subsequent uplink period be allocated to the passive source devices;
   during a second uplink period following the first downlink period, broadcasting a link set message to all the source devices, wherein the link set message is broadcast by a primary passive source device among the passive source devices, and wherein the link set message is broadcast to establish a communication link between the primary passive source and the primary sink device;
   during a second downlink period following the second uplink period, relaying the link set message to all the sink devices, wherein the link set message is relayed by the active source device; and
   during a third uplink period following the second downlink period, establishing a communication link between the primary passive source device and the primary sink device by the primary sink device.

7. The method of claim 6, further comprising during a third downlink period prior to the first downlink period, broadcasting an uplink period permission message to all the sink devices, wherein the uplink period permission message is broadcast by the active source device, and wherein the uplink period permission message indicates that the passive source devices are allowed to use uplink periods.

8. The method of claim 7, wherein the uplink period permission message broadcast during the third downlink period, the uplink period allocation message broadcast during the first downlink period, and the link set message broadcast during the second downlink period have a first message format, and the uplink period allocation requesting message broadcast during the first uplink period, the link set message broadcast during the second uplink period, and a link response message for establishing the communication link broadcast during the third uplink period have a second message format, wherein the first message format and the second message format are generated according to different modulation methods.

9. The method of claim 6, wherein the establishing the communication link between the primary passive source device and the primary sink device comprises broadcasting a link response message to the all source devices in the network, wherein the link response message is broadcast by the primary sink device, and wherein the link response message comprises an acknowledgement of receipt of the link set message, a request for canceling the communication link established with the active source device, and a request for establishing the communication link with the primary passive source device.

10. The method of claim 6, wherein the primary sink device further transmits at least one control signal during at least one uplink period except for the first uplink period, the second uplink period, and the third uplink period, and the uplink period allocation requesting message is transmitted earlier than the at least one control signal.

11. A method of changing a communication link between source devices and sink devices in a network in which uplink periods for uplink transmission and downlink periods for downlink transmission are alternately scheduled, the method comprising:

during a first uplink period, broadcasting an uplink period allocation requesting message to all the source devices in the network, wherein the uplink period allocation message is broadcast by a primary sink device from among the sink devices, and wherein the uplink period allocation requesting message requests passive source devices, in which a communication link is not set, to use a subsequent uplink period;

during a first downlink period following the first uplink period, broadcasting an uplink period allocation message to all the sink devices in the network, wherein the uplink period allocation message is broadcast by an active source device that establishes a communication link with the primary sink device, and wherein the uplink period allocation message instructs that the subsequent uplink period be allocated to the passive source devices;

during a second uplink period following the first downlink period, broadcasting a link set message to all the sink devices, wherein the link set message is broadcast by a primary passive source device among the passive source devices, and wherein the link set message is broadcast to establish a communication link between the primary passive source device and the primary sink device; and during a third uplink period following the second uplink period, establishing a communication link between the primary passive source device and the primary sink device by the primary sink device.

12. The method of claim 11, wherein the uplink period allocation requesting message comprises:

a preamble;
a channel estimation sequence for estimating characteristics of a channel via which messages are transmitted;
message type information indicating that the uplink period allocation requesting message is broadcast for requesting the passive source devices to use the subsequent uplink period;
a time offset for determining a start of the subsequent uplink period to be allocated to the passive source devices; and
a duration of the subsequent uplink period to be allocated.

13. The method of claim 12, wherein the channel estimation sequence comprises sixteen symbols or less.

14. The method of claim 11, further comprising during a second downlink period prior to the first downlink period, broadcasting an uplink period permission message to all the sink devices, wherein the uplink period permission message is broadcast by the active source device, and wherein the uplink period permission message indicates that the passive source devices are allowed to use uplink periods.

15. The method of claim 14, wherein the uplink period permission message broadcast during the second downlink period and the uplink period allocation message broadcast during the first downlink period have a first message format, the uplink period allocation requesting message broadcast during the first uplink period and a link response message for establishing the communication link broadcast during the third uplink period have a second message format, and the link set message broadcast during the second uplink period has a third message format generated by extracting a part of the first message format, wherein the first message format and the third message format are generated according to modulation methods which are different from a modulation method used to generate the second message format.

16. The method of claim 11, wherein the uplink period allocation message broadcast during the first downlink period has a first message format, the uplink period allocation requesting message broadcast during the first uplink period and the link response message broadcast during the third uplink period have a second message format, and the link set message broadcast during the second uplink period has a third message format generated by extracting a part of the first message format, wherein the first message format and the third message format are generated according to modulation methods which are different from a modulation method used to generate the second message format.

17. The method of claim 15, wherein the first message format comprises a header and a payload, the third message format comprises only a header, and
a sum of a length of the header of the first message format and a length of the header of the third message format is less than a vertical blanking period.

18. The method of claim 11, wherein the primary sink device further transmits at least one control signal during at least one uplink period except for the first uplink period, the second uplink period, and the third uplink period, and the uplink period allocation requesting message is transmitted earlier than the at least one control signal.

19. A network system in which uplink periods for uplink transmission between source devices and sink devices and downlink periods for downlink transmission between the source devices and the sink devices are alternately scheduled, the network system comprising:

an active source device which establishes a communication link with a primary sink device from among the sink devices, and broadcasts an uplink period allocation message to the sink devices and passive source devices during a first downlink period, wherein the uplink period allocation message instructs that a subsequent uplink period be allocated to the passive source devices in which a communication link is not set;

a primary passive source device which broadcasts a link set message to all the source devices in the network during a first uplink period following the first downlink period, wherein the link set message is broadcast to establish a communication link between the primary passive source device and the primary sink device; and the primary sink device which establishes a communication link with the primary passive source device during a second uplink period when the active source device relays the link set message to all the sink devices in the network during a second downlink period following the first uplink period, wherein the second uplink period follows the second downlink period.

20. The network system of claim 19, wherein the primary sink device establishes a communication link with the primary passive source device by broadcasting a link response message to all the source devices in the network, wherein the link response message comprises an acknowledgement of receipt of the link set message, a request for canceling the communication link established with the active source device, and a request for establishing the communication link with the primary passive source device.

21. The network system of claim 19, wherein the uplink period allocation message broadcast during the first downlink period and the link set message relayed during the second downlink period have a first message format, and the link set message broadcast during the first uplink period and a link response message for establishing the communication link broadcast during the second uplink period have a second message format, wherein the first message format is generated according to a modulation method that is different from a modulation method used to generate the second message format.

22. The network system of claim 19, wherein the link set message comprises:

message type information indicating that the link set message is broadcast to establish a communication link between a source device and a sink device;

an identifier of the primary passive source device; and an identifier of the primary sink device.

23. The network system of claim 22, wherein during the first uplink period, the primary passive source device transmits a link relay message that comprises the link set message, an identifier of a device corresponding to a final destination of the link set message, and a whole length of the link relay message.

24. A network system in which uplink periods for uplink transmission between source devices and sink devices and downlink periods for downlink transmission between the source devices and the sink devices are alternately scheduled, the network system comprising:

a primary sink device which broadcasts an uplink period allocation requesting message to all the source devices in the network during a first uplink period, wherein the uplink period allocation requesting message requests passive source devices, in which a communication link is not set, to use a subsequent uplink period;

an active source device which establishes a communication link with the primary sink device, and broadcasts an uplink period allocation message to all the sink devices in the network during a first downlink period following the first uplink period, wherein the uplink period allocation message instructs that the subsequent uplink period be allocated to the passive source devices; and a primary passive source device which broadcasts a link set message for establishing a communication link with the primary sink device to all the source devices during a second uplink period following the first downlink period, wherein, when the active source device relays the link set message to all the sink devices in a second downlink period, the primary sink device establishes a communication link with the primary passive source device during a third uplink period following the second uplink period.

25. The network system of claim 24, wherein, during a third downlink period prior to the first downlink period, the active source device broadcasts to all the sink devices an uplink period permission message indicating that the passive source devices are allowed to use uplink periods.

26. The network system of claim 25, wherein, the uplink period permission message broadcast during the third downlink period, the uplink period allocation message broadcast during the first downlink period, and the link set message broadcast during the second downlink period have a first message format, and the uplink period allocation requesting message broadcast during the first uplink period, the link set message broadcast during the second uplink period, and a link response message for establishing the communication link broadcast during the third uplink period have a second message format, wherein the first message format is generated according to a modulation method that is different from a modulation method used to generate the second message format.

27. The network system of claim 24, wherein the primary sink device establishes the communication link with the primary passive source device by broadcasting a link response message that comprises an acknowledgement of receipt of the link set message, a request for canceling the communication link established with the active source device, and a request for establishing a communication link with the primary passive source device.

28. The network system of claim 24, wherein the primary sink device further transmits at least one control signal during at least one uplink period except for the first uplink period, the second uplink period, and the third uplink period, and the uplink period allocation requesting message is transmitted earlier than the at least one control signal.

29. A network system in which uplink periods for uplink transmission between source devices and sink devices and downlink periods for downlink transmission between the source devices and the sink devices are alternately scheduled, the network system comprising:

a primary sink device which broadcasts an uplink period allocation requesting message to all the source devices in the network during a first uplink period, where the uplink period allocation requesting message requests passive source devices, in which a communication link is not set, to use a subsequent uplink period;

an active source device which establishes a communication link with the primary sink device, and broadcasts an uplink period allocation message to all the sink devices in the network during a first downlink period following the first uplink period, wherein the uplink period allocation message instructs that the subsequent uplink period be allocated to the passive source devices; and a primary passive source device which broadcasts a link set message for establishing a communication link with the primary sink device to all the sink devices during a second uplink period following the first downlink period, wherein the primary sink device establishes a communication link with the primary passive source device during a third uplink period following the second uplink period.

30. The network system of claim 29, wherein the uplink period allocation requesting message comprises:
a preamble;
a channel estimation sequence for estimating characteristics of a channel via which messages are transmitted;
message type information indicating that the uplink period allocation requesting message is broadcast for requesting the passive source devices to use the subsequent uplink period;
a time offset for determining a start of the subsequent uplink period to be allocated to the passive source devices; and
a duration of the subsequent uplink period to be allocated.

31. The network system of claim 30, wherein the channel estimation sequence comprises sixteen symbols or less.

32. The network system of claim 29, wherein the active source device broadcasts an uplink period permission message indicating that the passive source devices are allowed to use uplink periods to all the sink devices during a second downlink period prior to the first downlink period.

33. The network system of claim 32, wherein the uplink period permission message broadcast during the second downlink period and the uplink period allocation message broadcast during the first downlink period have a first message format,
the uplink period allocation requesting message broadcast during the first uplink period and a link response message for establishing the communication link broadcast during the third uplink period have a second message format, and
the link set message broadcast during the second uplink period has a third message format generated by extracting a part of the first message format,
wherein the first message format and the third message format are generated according to modulation methods that are different from a modulation method used to generate the second message format.

34. The network system of claim 29, wherein the uplink period allocation message broadcast during the first downlink period has a first message format,
the uplink period allocation requesting message broadcast during the first uplink period and a link response message for establishing the communication link broadcast during the third uplink period have a second message format, and
the link set message broadcast during the second uplink period has a third message format generated by extracting a part of the first message format,
wherein the first message format and the third message format are generated according to modulation methods that are different from a modulation method used to generate the second message format.

35. The network system of claim 33, wherein the first message format comprises a header and a payload,
the third message format comprises only a header, and
a sum of a length of the header of the first message format and a length of the header of the third message format is less than a vertical blanking period.

36. The network system of claim 29, wherein the primary sink device further transmits at least one control signal during at least one uplink period except for the first uplink period, the second uplink period, and the third uplink period, and
the uplink period allocation requesting message is transmitted earlier than the at least one control signal.

37. A non-transitory computer readable recording medium having recorded thereon a computer program for executing the method of claim 1.

38. A non-transitory computer readable recording medium having recorded thereon a computer program for executing the method of claim 6.

39. A non-transitory computer readable recording medium having recorded thereon a computer program for executing the method of claim 11.

* * * * *